United States Patent
Kim et al.

(10) Patent No.: US 9,615,186 B2
(45) Date of Patent: Apr. 4, 2017

(54) APPARATUS AND METHOD FOR RECOGNIZING HORN USING SOUND SIGNAL PROCESSOR

(71) Applicant: Hyundai Motor Company, Seoul (KR)

(72) Inventors: Jae Kwang Kim, Seoul (KR); Yoon Ho Jang, Seoul (KR)

(73) Assignee: Hyundai Motor Company, Seoul (KR)

( * ) Notice: Subject to any disclaimer, the term of this patent is extended or adjusted under 35 U.S.C. 154(b) by 52 days.

(21) Appl. No.: 14/569,687

(22) Filed: Dec. 13, 2014

(65) Prior Publication Data

US 2016/0112816 A1 Apr. 21, 2016

(30) Foreign Application Priority Data

Oct. 15, 2014 (KR) .................. 10-2014-0139295

(51) Int. Cl.
*H04R 29/00* (2006.01)
*G08G 1/0965* (2006.01)
(Continued)

(52) U.S. Cl.
CPC .............. *H04R 29/00* (2013.01); *B60W 30/12* (2013.01); *G08G 1/0965* (2013.01); *G08G 1/166* (2013.01); *G08G 1/167* (2013.01); *B60Q 9/008* (2013.01)

(58) Field of Classification Search
CPC ........ H04R 29/00; G08G 1/166; G08G 1/167; G08G 1/0965; B60W 30/12; B60Q 9/008; G06K 9/00825
See application file for complete search history.

(56) References Cited

U.S. PATENT DOCUMENTS

| 4,952,931 A * | 8/1990 | Serageldin | G08G 1/0965 340/901 |
| 5,495,242 A * | 2/1996 | Kick | G08G 1/087 340/902 |

(Continued)

FOREIGN PATENT DOCUMENTS

JP H11-327588 A 11/1999
KR 10-2005-0120983 12/2005
(Continued)

OTHER PUBLICATIONS

Gray et al., Robert M., "An Introduction to Statistical Signal Processing", Cambridge University Press, (1999) pp. 289-291.
(Continued)

*Primary Examiner* — Andrew L Sniezek
(74) *Attorney, Agent, or Firm* — Mintz Levin Cohn Ferris Glovsky and Popeo, P.C.; Peter F. Corless

(57) ABSTRACT

An apparatus and a method for recognizing a horn using a sound signal processor are provided. The apparatus includes a data storage unit configured to acquire and store surrounding sound data and a sound signal processor configured to sample a sound signal within the sound data, perform signal conversion, and define and extract the frequency signals. In addition, a horn recognizer is configured to combine the extracted frequency signals, accumulate the frequency signals, and digitize a change rate of the accumulated frequency signals. Further, an output data determiner is configured to determine whether the digitized change rate of the frequency signals is equal to or greater than a threshold value to determine whether and when the horn is generated.

15 Claims, 3 Drawing Sheets

(51) Int. Cl.
*B60W 30/12* (2006.01)
*G08G 1/16* (2006.01)
*B60Q 9/00* (2006.01)

(56) References Cited

U.S. PATENT DOCUMENTS 8,461,986 B2 * 6/2013 Snyder ................. H04R 25/305
340/4.1
9,275,136 B1 * 3/2016 Sharifi .............. G06F 17/30743

FOREIGN PATENT DOCUMENTS

| KR | 2008-0090785 | 10/2008 |
|----|--------------|---------|
| KR | 2013-0044067 | 5/2013  |

OTHER PUBLICATIONS

Zolnay et al., Andras, "Acoustic Feature Combination for Robust Speech Recognition", ICASSP (1) 2005, pp. 457-460.
Mitrovic et al., Dalibor, "Features for Content-Based Audio Retrieval", Advances in Computers, (2010) 78, pp. 71-150.

* cited by examiner

APPARATUS AND METHOD FOR RECOGNIZING HORN USING SOUND SIGNAL PROCESSOR

CROSS-REFERENCE TO RELATED APPLICATION

This application is based on and claims the benefit of Korean Patent Application No. 10-2014-0139295, filed on Oct. 15, 2014, the disclosure of which is incorporated herein in its entirety by reference.

TECHNICAL FIELD

The present disclosure relates to an apparatus and a method for recognizing a horn using a sound signal processor, and more particularly, to extracting a feature optimized for horn sound characteristics using a sound signal.

BACKGROUND

When a driver intends to change lanes into an adjacent lane while operating (e.g., driving) a vehicle, the driver may not see an adjacent vehicle being driven in close proximity to the driver's vehicle since the adjacent vehicle may be in a blind spot of a side mirror. In particular, the adjacent vehicle may operate (e.g., beep or engage) a horn to warn the driver of a possibility of an accident and the driver may stop changing lanes and drive within an original lane again to avoid an accident.

However, when a volume of a sound system of the driver's vehicle is substantially loud, an interior of the vehicle may be loud or a driver may be hearing-impaired (e.g., does not have hearing ability), the driver may cause a traffic accident by attempting a lane change while not hearing a horn operated by another vehicle.

SUMMARY

An aspect of the present disclosure provides an apparatus and a method for recognizing a horn sound using a sound signal processor capable of detecting a vehicle operating a horn by processing a received sound signal using a microphone and preventing an accident by enabling a driver to recognize the horn sound. Other objectives and advantages of the present disclosure may be appreciated by the following description and will be clearly described by the exemplary embodiments of the present disclosure. Also, it can be easily understood that the objectives and advantages of the present disclosure may be realized by the units and combinations thereof recited in the claims.

According to an exemplary embodiment of the present disclosure, an apparatus for recognizing a horn using a sound signal processor may include: a data storage unit configured to acquire and store surrounding sound data from a microphone; a sound signal processor configured to sample a sound signal within the sound data, perform signal conversion on frequencies of the sampled sound signal, and define and extract the frequency signals which understand horn sound characteristics from the converted frequency signals; a horn recognizer configured to combine the extracted frequency signals, accumulate the frequency signals, and digitize a change rate of the accumulated frequency signals; and an output data determiner configured to determine whether the digitized change rate of the frequency signals is equal to or greater than a threshold value to determine whether and when the horn sound is generated.

The frequency signals may include a fundamental frequency signal, which may be a frequency band of about 300 hertz (Hz) to about 500 Hz and harmonics, which may be set from about 2 to about 10 multiples of the frequency band of the fundamental frequency signal, based on a horn design standard. The sound signal processor may use a total power spectrum P and a spectrum flux SF to extract the frequency signals. The total power spectrum P may be a sum of total power within a frame section of the sampled sound signal. The spectrum flux SF may be a change rate of power between frames of the sampled sound signal.

According to another exemplary embodiment of the present disclosure, a method for recognizing a horn using a sound signal processor may include: acquiring and storing surrounding sound data from a microphone; sampling a sound signal within the sound data; performing signal conversion on frequencies of the sampled sound signal; and defining and extracting the frequency signals which exhibit horn sound characteristics from the converted frequency signals; combining the extracted frequency signals; accumulating the frequency signals; digitizing a change rate of the accumulated frequency signals; and determining whether the digitized change rate of the frequency signals is equal to or greater than a threshold value to determine whether and when the horn sound is generated.

The frequency signals which exhibit the horn sound characteristics may include a fundamental frequency signal of a frequency band of about 300 Hz to about 500 Hz and harmonics, which may be set from about 2 to about 10 multiples of the frequency band of the fundamental frequency signal, based on a horn design standard. The extraction of the feature of the frequency signals may use a total power spectrum P and a spectrum flux SF to extract the feature of the frequency signals, which exhibit the horn sound characteristics. The total power spectrum P may be a sum of total power within a frame section of the sampled sound signal. The spectrum flux SF may be a change rate of power between frames of the sampled sound signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
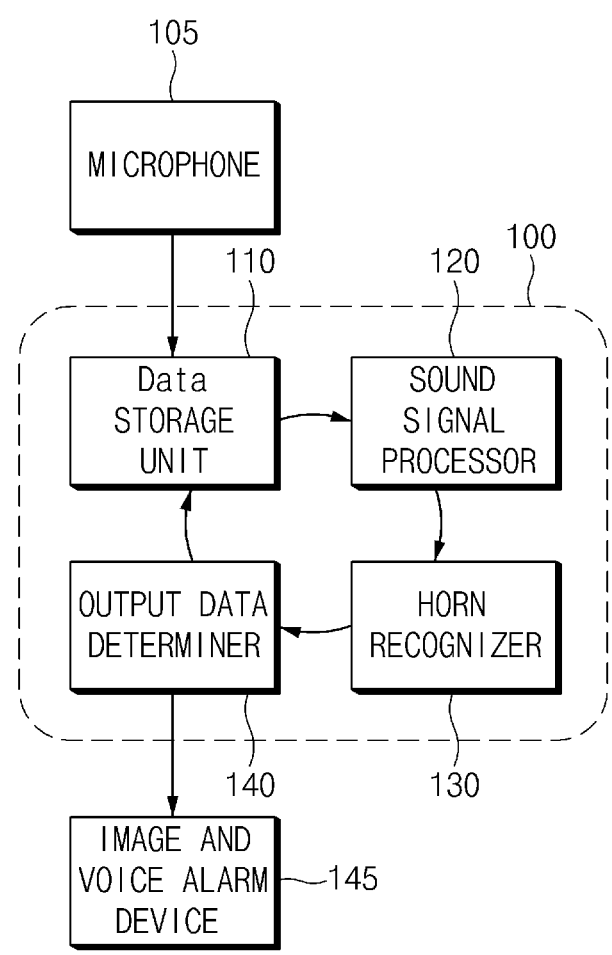
FIG. 1 is an exemplary configuration diagram illustrating an apparatus for recognizing a horn using a sound signal processor according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The foregoing objects, features and advantages will become more apparent from the following detailed description of exemplary embodiments of the present disclosure with reference to accompanying drawings, which are set forth hereinafter. Accordingly, those having ordinary knowledge in the related art to which the present disclosure pertains will easily embody technical ideas or spirit of the present disclosure. Further, when the detailed description of technologies known in the related art is considered to make the gist of the present disclosure obscure, the detailed description thereof will be omitted. Hereinafter, exemplary embodiments of the present disclosure will be described in detail with reference to the accompanying drawings.

FIG. 1 is an exemplary configuration diagram illustrating an apparatus for recognizing a horn using a sound signal processor according to an exemplary embodiment of the present disclosure. Referring to FIG. 1, the apparatus 100 for recognizing a horn using a sound signal processor may include a data storage unit 110, a sound signal processor 120, a horn recognizer 130, and an output data determiner 140.

The sound signal processor 120 may be configured to operate the data storage unit 110, the horn recognizer 130, and the output data determiner 140.

The apparatus 100 may further include a microphone 105 configured to receive surrounding sound data and an image and a voice alarm device 145 configured to operate a horn sound within a vehicle that displays a horn signal on a display device within the vehicle to enable a driver to detect the horn signal. The data storage unit 110 may be configured to acquire and store surrounding sound data from the microphone 105. The sound signal processor 120 may be configured to sample a sound signal within the sound data and execute frequency conversion on the sampled sound signal. In particular, as a method for sampling a sound signal, a frame, in which a period and a width of the sound signal are divided, may be generated to sample a desired (e.g., set) area within the frame. The method for sampling a sound signal is similar to the related art and therefore the detailed description thereof will be omitted.

The sound signal processor 120 may be configured to define the converted frequency as a frequency which may be optimized for horn sound characteristics (e.g., frequency at which a feature included within the horn sound signal may be determined). The frequency optimized for the horn sound characteristics may be selected as an available frequency. The available frequency may be a range or a width of frequency when a feature included within the horn sound signal may be extracted, based on a design standard of the horn signal. The feature included within the horn signal may be a preset period and width of frequency, which may be set by averaging the range or the width of frequency extracted from various (e.g., different) horn signals. The available frequency may be classified into a fundamental frequency and harmonics. The fundamental frequency may be a frequency band of about 300 Hz to about 500 Hz and the harmonics may be a multiple of the fundamental frequency. In particular, the harmonics may be a frequency up to about 10 multiples of the frequency band that is included within the fundamental frequency.

The sound signal processor 120 may be configured to extract frequency signals within the available frequency band. The frequency signals within the set available frequency band may be extracted from the frequency signal using a band-pass filter. A method for extracting a frequency signal within the available frequency band may include extracting a frequency using a total power spectrum P, a spectrum flux SF, and a sub band, extracting a substantial center (e.g., average) frequency, extracting a bandwidth, extracting a pitch frequency, and extracting mel-frequency cepstral coefficients (MFCC), and the like.

The horn recognizer 130 may be configured to combine the extracted frequency signals and accumulate the frequency signals. In other words, a change degree (e.g., change rate) of the accumulated frequency signals may be confirmed and digitized. For example, a method for combining frequency signals may simplify a horn sound recognition process using a horn recognition determination criterion F. The method for combining frequency signals will be described based on the total power spectrum and the spectrum flux.

In particular, P may be the total power spectrum value, SF may be the spectrum flux value, and the horn recognition determination criterion F may be a criterion to maximize a probability of recognizing the horn. In addition, within the method for extracting a frequency signal, when the value extracted from the total power spectrum P is substantially high and the value extracted from the spectrum flux SF is substantially low, the horn recognition determination criterion F may be a substantially high probability criterion to recognize the horn sound, as shown in Equation 1.

$$F=P^*\exp(-SF) \qquad \text{Equation 1}$$

The output data determiner 140 may be configured to determine whether the change degree of the frequency signals is equal to or greater than a constant value (e.g., threshold value). In response to determining the change degree of the frequency signals is equal to or greater than the constant value, a driver may recognize whether and when the horn is generated. Further, the apparatus may be configured to output an alarm using the image and voice alarm device 145 within the vehicle or display the horn signal on a display device within the vehicle.

Figure 2:
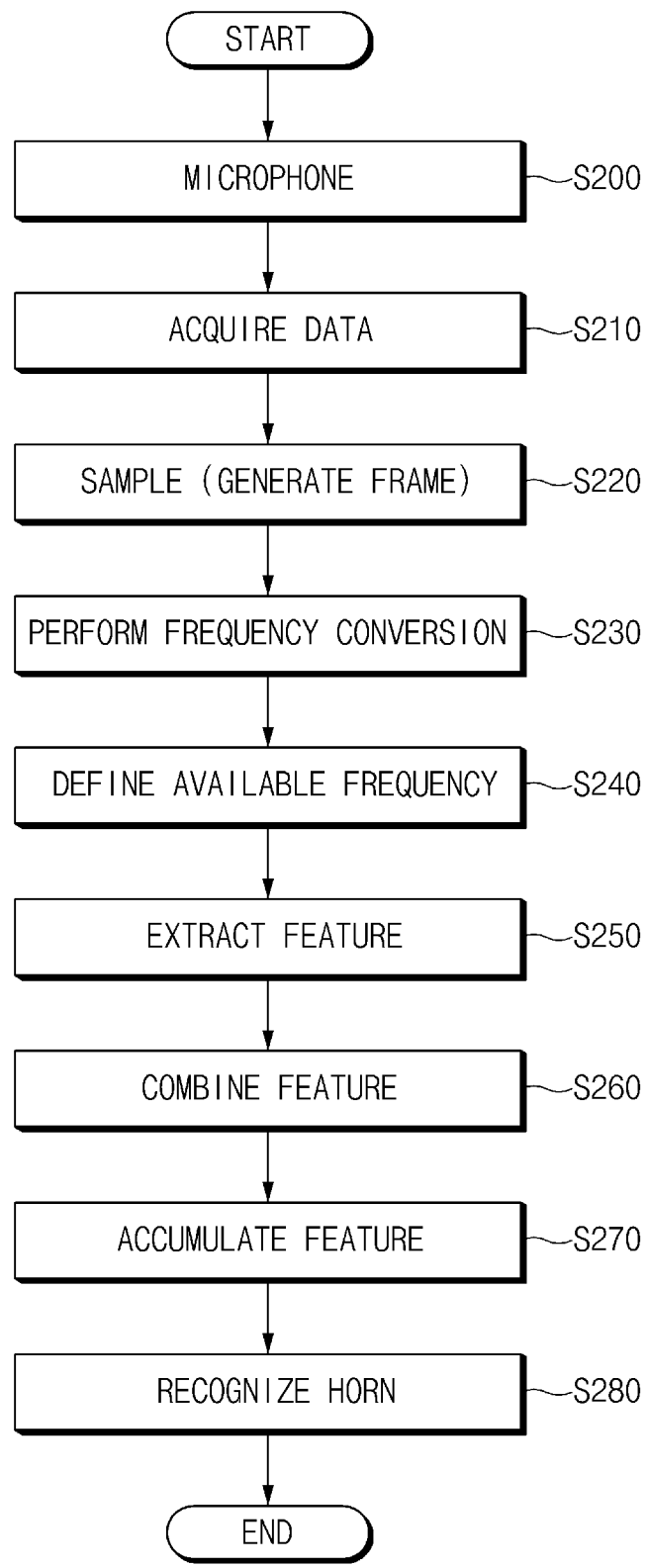
FIG. 2 is an exemplary diagram illustrating a method for recognizing a horn using a sound signal processor according to an exemplary embodiment of the present disclosure.

FIG. 2 is an exemplary diagram illustrating a method for recognizing a horn using a sound signal processor according to an exemplary embodiment of the present disclosure. Referring to FIG. 2, the method may include acquiring, by a processor, the surrounding sound data from a microphone, which may be disposed within the vehicle (S200 and S210). The method may also include sampling, by the processor, the sound signal within the sound data and performing the frequency conversion on the sampled sound signal (S220 and S230). In particular, as a method for sampling a sound signal, a frame, in which a period and a width of the sound signal are divided, may be generated to sample a desired portion (e.g., set) within the frame.

The converted frequency may be defined as the frequency which may be optimized for the horn sound characteristics (e.g., frequency at which the feature included within the horn signal may be determined) (S240). The frequency optimized for the horn characteristics may be selected as an available frequency. The available frequency may represent the range, or the width, of frequency when the feature of the horn sound signal may be extracted, based on the design standard of the horn sound signal. The available frequency may be classified into a fundamental frequency and harmonics. The fundamental frequency may be a frequency band of about 300 Hz to about 500 Hz and the harmonics may be a multiple area of the fundamental frequency. For example, the harmonics may be a frequency that is about 10 times the frequency band that is included in the fundamental frequency. The available frequency may be a value defined based on a horn design standard and may help extract the feature optimized for the horn sound recognition using the frequency band for the horn sound recognition.

The frequency signals within the available frequency band may be extracted (S250). The frequency signals within the set available frequency band may be extracted from the frequency signal using a band-pass filter. The method for extracting a frequency signal within an available frequency band may use a mechanism for extracting the frequency signals of the total power spectrum P and the spectrum flux SF. In particular, the total power spectrum P may be an energy distribution of the total spectrum within a frame section in which the period and the width of the sound signal are divided. In addition, the spectrum flux SF may be a change rate of a power value of spectrum between frames in which the period and the width of the sound signal are divided.

The extracted frequency signals may be combined and the frequency signals may be accumulated over time (S260 and S270). In other words, the change degree (e.g., change rate) of the accumulated frequency signals may be confirmed and the change degree of the frequency signals for horn recognition may be digitized. Whether the change degree (e.g., change rate) of the frequency signals is equal to or greater than a constant value (e.g., threshold value) may be determined (S280). When the change degree of the frequency signals is equal to or greater than the constant value, a driver may recognize the horn by recognizing whether and when the horn is generated. The method for enabling a driver to recognize a horn may include sounding, by the processor, the horn sound within the vehicle using an image and voice alarm device within the vehicle or displaying, by the processor, a horn signal on the display device within the vehicle.

Figure 3A:
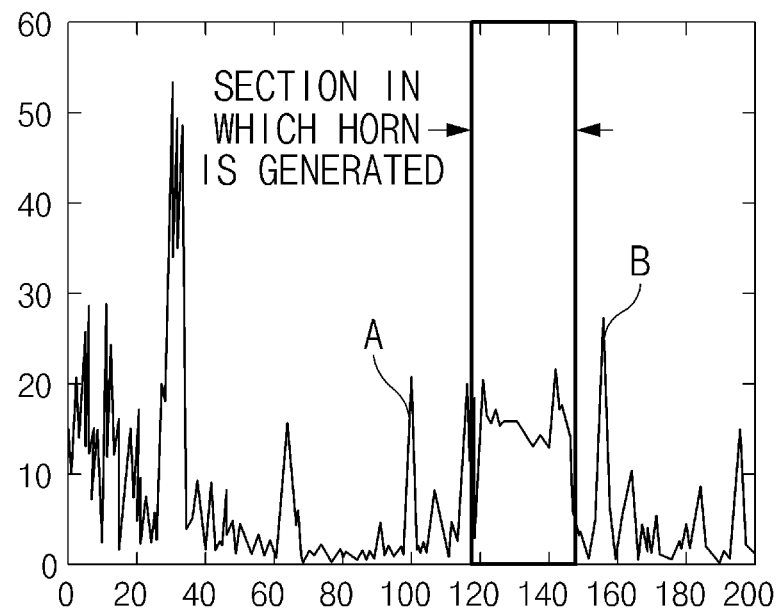
FIGS. 3A and 3B are exemplary diagrams illustrating an application example of an available frequency according to an exemplary embodiment of the present disclosure.
Figure 3B:
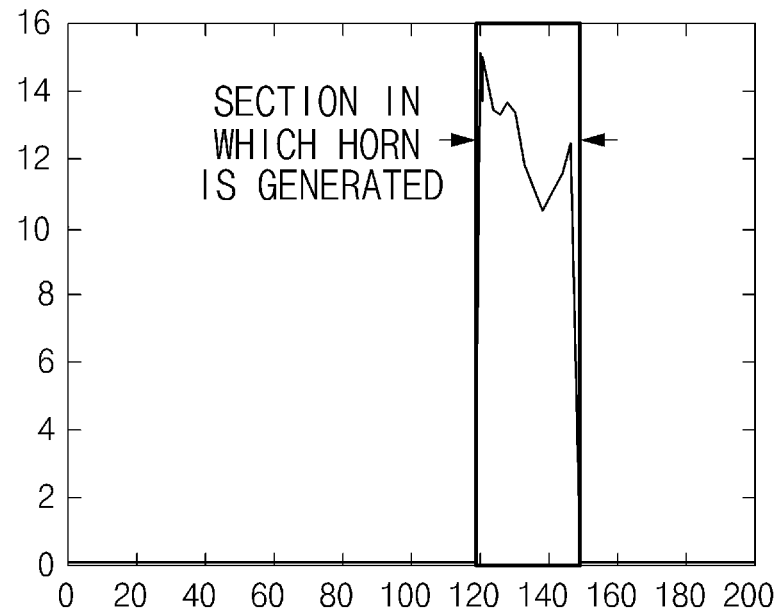

FIGS. 3A and 3B are exemplary diagrams illustrating an application example of an available frequency according to an exemplary embodiment of the present disclosure. FIG. 3A illustrates an exemplary section in which the horn is generated and an exemplary section in which the horn is not generated. For example, the method may recognize greater values (e.g., frequencies A and B that have louder noise) even when the horn is not generated. The band and the width of the frequency of the section in which the horn is generated and the band and the width of the frequency of the section in which the horn is not generated may be difficult to differentiate. In particular, a person may not recognize the horn of surrounding vehicles, which may hinder a traffic flow or may cause an accident (e.g., vehicle collision).

FIG. 3B illustrates an exemplary section in which the horn is generated and an exemplary section in which the horn is not generated after the available frequency is applied. For example, when the method, which uses the available frequency, filters the frequency band to extract the total power spectrum P using the frequency signal within the available frequency band, the method, which uses the available frequency, may include extracting, by the processor, a feature value (e.g. horn sound frequency signal) within the section in which the horn is generated, which may facilitate the comparison or division between the section when the horn is generated and the section when the horn is not generated. The driver may more easily recognize the horn signal, stably drive a vehicle, and prevent an accident.

According to exemplary embodiments of the present disclosure, a collision risk with another vehicle may be reduced by detecting the vehicle that is outputting the horn sound around a vehicle and enabling the driver to recognize the horn sound. Further, the economic efficiency using a less expensive sensor which may recognize the horn sound may be produced.

Although the exemplary embodiments of the present disclosure have been disclosed based on restricted configuration and drawings, the technical ideas of the present disclosure are not limited thereto. Therefore, those skilled in the art will appreciate that various modifications and changes may be made, without departing from the scope and spirit of the present disclosure as disclosed in the accompanying claims.

What is claimed is:

1. An apparatus for recognizing a horn using a sound signal process, comprising:
a memory configured to store program instructions;
a sound signal processor configured to execute program instructions, the program instructions when executed configured to:
acquire and store surrounding sound data from a microphone;
sample a sound signal within the sound data;
perform signal conversion on frequencies of the sampled sound signal;

define and extract frequency signals that exhibit horn sound characteristics from the converted frequency signals;
combine the extracted frequency signals;
accumulate the combined frequency signals over time;
calculate a change of the accumulated frequency signals; and
determine whether the calculated change of the frequency signals is equal to or greater than a threshold value to determine whether and when the horn is generated.

2. The apparatus according to claim 1, wherein the frequency signals which exhibit the horn sound characteristics include:
   a fundamental frequency signal of a frequency band of about 300 Hz to about 500 Hz; and
   a harmonics set from about 2 to about 10 multiples of the frequency band of the fundamental frequency signal.

3. The apparatus according to claim 1, wherein in the extraction of the frequency signals that exhibit the horn sound characteristics, the sound signal processor is further configured to use a total power spectrum and a spectrum flux to extract the frequency signals.

4. The apparatus according to claim 3, wherein the total power spectrum is a sum of total power within a frame section of the sampled sound signal.

5. The apparatus according to claim 3, wherein the spectrum flux is a change rate of power between frames of the sampled sound signal.

6. A method for recognizing a horn using a sound signal process, comprising:
   acquiring, by a processor, and storing surrounding sound data using a microphone;
   sampling, by the processor, a sound signal within the sound data;
   performing, by the processor, signal conversion on frequencies of the sampled sound signal;
   defining and extracting, by the processor, frequency signals which exhibit horn sound characteristics from the converted frequency signals;
   combining, by the processor, the extracted frequency signals;
   accumulating, by the processor, the combined frequency signals over time;
   calculating, by the processor, a change of the accumulated frequency signals; and
   determining, by the processor, whether the calculated change of the frequency signals is equal to or greater than a threshold value to determine whether and when a horn is generated.

7. The method according to claim 6, wherein the frequency signals which exhibit the horn sound characteristics include:
   a fundamental frequency signal of a frequency band of about 300 Hz to about 500 Hz; and
   a harmonics set from about 2 to about 10 multiples of the frequency band of the fundamental frequency signal.

8. The method according to claim 6, wherein in the extraction of features of the frequency signals includes:
   using a total power spectrum and a spectrum flux to extract the feature of the frequency signals which exhibit the horn characteristics.

9. The method according to claim 8, wherein the total power spectrum is a sum of total power within a frame section of the sampled sound signal.

10. The method according to claim 8, wherein the spectrum flux is a change rate of power between frames of the sampled sound signal.

11. A non-transitory computer readable medium containing program instructions executed by a processor, the computer readable medium comprising:
    program instructions that acquire and store surrounding sound data from a microphone;
    program instructions that sample a sound signal within the sound data;
    program instructions that perform signal conversion on frequencies of the sampled sound signal;
    program instructions that define and extract frequency signals that exhibit horn sound characteristics from the converted frequency signals;
    program instructions that combine the extracted frequency signals;
    program instructions that accumulate the combined frequency signals over time;
    program instructions that calculate a change of the accumulated frequency signals; and
    program instructions that determine whether the calculated change of the frequency signals is equal to or greater than a threshold value to determine whether and when the horn is generated.

12. The non-transitory computer readable medium of claim 11, wherein the frequency signals which exhibit the horn sound characteristics include:
    a fundamental frequency signal of a frequency band of about 300 Hz to about 500 Hz; and
    a harmonics set from about 2 to about 10 multiples of the frequency band of the fundamental frequency signal.

13. The non-transitory computer readable medium according to claim 11, wherein in program instructions that extract of features of the frequency signals includes:
    program instructions that use a total power spectrum and a spectrum flux to extract the feature of the frequency signals which exhibit the horn characteristics.

14. The non-transitory computer readable medium according to claim 13, wherein the total power spectrum is a sum of total power within a frame section of the sampled sound signal.

15. The non-transitory computer readable medium according to claim 13, wherein the spectrum flux is a change rate of power between frames of the sampled sound signal.

* * * * *